Feb. 9, 1937. P. DAY, JR 2,070,155
CULTIVATOR BLADE ATTACHMENT
Filed Sept. 1, 1936
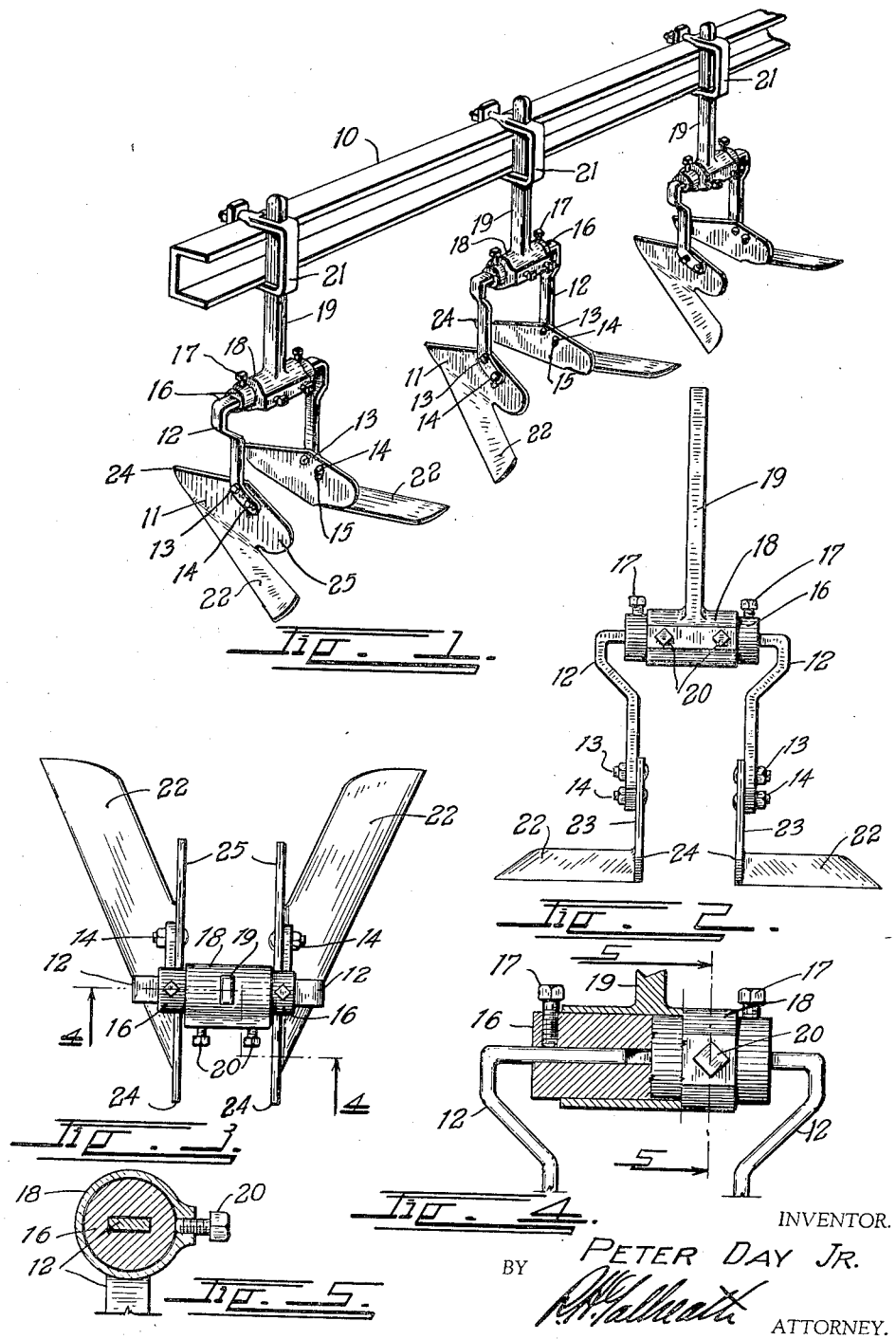
INVENTOR.
PETER DAY JR.
BY
ATTORNEY.

Patented Feb. 9, 1937

2,070,155

UNITED STATES PATENT OFFICE 2,070,155

CULTIVATOR BLADE ATTACHMENT

Peter Day, Jr., Fort Collins, Colo.

Application September 1, 1936, Serial No. 98,847

5 Claims. (Cl. 97—198.1)

This invention relates to an improvement in cultivators, and has for its principal object, the provision of a highly efficient cultivator blade in combination with a unitary bracket for supporting a pair of blades from the cultivator bar so that the blades at both sides of the row can be regulated and adjusted simultaneously.

Another object of the invention is to provide a cultivator blade bracket by means of which the row distance and heighth setting, can be changed without interfering with the angle setting of the blades at each side of the row, and in which the blades at both sides of the row will always remain in their proper relative adjustment. A further object is to provide a blade construction, which cut and remove the weeds at both sides of, and in close proximity, to the plants without disturbing the roots of the latter.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:—

Fig. 1 illustrates a series of the improved blades and brackets attached to a typical cultivator bar.

Fig. 2 is a rear elevation of a pair of blades combined with the improved supporting bracket.

Fig. 3 is a plan view thereof.

Fig. 4 is a detail view of the rotary bracket head, partially in section. The section in this view is taken on the line 4—4, Fig. 3.

Fig. 5 is a detail cross section through the rotary bracket head, taken on the line 5—5, Fig. 4.

The invention can be applied to any type of cultivator frame. Therefor, the cultivator frame itself, forms no part of the present invention. A cultivator bar of a typical cultivator is indicated at 10 to illustrate the method of attachment of the invention thereto.

The invention comprises cultivating blades of special design, designated in their entirety by the numeral 11. The blades 11 are carried on the lower extremities of inverted L-shaped brackets 12. The connection between the brackets 12 and the blades is made through a pivot bolt 13 and an adjusting bolt 14. The latter passes through an elongated arcuate slot 15 in the blade 11.

The brackets 12 are of opposite hand, that is, their upper ends are turned toward each other. These upper ends extend into a receiving channel formed through a cylindrical block 16. The brackets are locked in the block 16 at any desired degree of extension by means of suitable set screws 17.

The cylindrical block 16 is carried in a T-head 18, formed on the extremity of a vertical shank 19. The head 18 is provided with a bore for receiving the block 16. The cylindrical block 16 may be rotated to any desired position in the head 18, and set in this position by means of suitable set screws 20. The shank 19 is clamped to the cultivator bar 10 by means of the usual cultivator clamps 21.

It can be readily seen that the blades are held in pairs, that is, one blade for each side of a row, and that the pairs of blades are held as an individual unit on the shanks 19. The two blades can be adjusted relative to each other so that both will have the same angle on the brackets 12 by means of the adjusting bolts 14. After once adjusted, the bolts 14 are tightened, and they need not be again adjusted. The blades are then set for the desired row width by moving their brackets 12 inwardly or outwardly in the block 16. When the desired width has been obtained, the set screws 17 are tightened and need not be again changed.

The angle of both blades thereafter is changed or adjusted or regulated simultaneously by rotating the block 16 in the head 18. When the proper angle has been located, the block is locked in the head by means of the set screws 20. The heighth of the various sets of blades and the row spacing thereof is regulated by the position of the shanks 19 on the bar 10, does not interfere with the relative position between the blades of each pair. Therefor, the blades do not require individual adjusting, and will maintain their proper relative adjustment at all times.

The blades 11 each consist of an outwardly flaring flat inclined bottom or hoe member 22 jointed to a vertical cutting portion 23. The vertical portion terminates at its front in a relatively sharp point 24, and at its rear in a trailing mold board 25. It is desired to call attention to the fact that the lower edge from the point 24 merges into the forward edge of the hoe portion 22 so as to form a continuous smooth cutting edge. This construction avoids the catching and dragging of roots by the plows. The usual cultivator blade has a tendency to catch and drag tenacious roots along the row, thereby dragging the young plants from the row.

With this blade, however, the roots that are not cut are gradually wedged outwardly along the outwardly flared edges so as to be torn from position with the dragging, and a sharp land-side is left along the row to protect the plant roots. The cultivator has been found particularly valuable in the weeding and cultivating of sugar beets. It would be valuable for cultivating any tender, easily destroyed row crops.

While a specific form of the improvement has been described and illustrated herein, it is desired to be understood that the same may be varied, within the scope of the appended claims, without departing from the spirit of the invention.

Having thus described the invention, what is claimed and desired, secured by Letters Patent is:—

1. Means for supporting a pair of cultivator blades on a cultivator comprising: a shank for attachment to said cultivator; a horizontal head formed on said shank and provided with a cylindrical bore; a cylindrical block positioned in said bore; an inverted L-shaped bracket extending outwardly and downwardly from each extremity of said block; and a cultivator blade secured to the lower extremity of each bracket.

2. Means for supporting a pair of cultivator blades on a cultivator comprising: a shank for attachment to said cultivator; a horizontal head formed on said shank and provided with a cylindrical bore; a cylindrical block positioned in said bore; an inverted L-shaped bracket extending outwardly and downwardly from each extremity of said block; a cultivator blade secured to the lower extremity of each bracket; and means for locking said block at any desired position in said head.

3. Means for supporting a pair of cultivator blades on a cultivator comprising: a shank for attachment to said cultivator; a horizontal head formed on said shank and provided with a cylindrical bore; a cylindrical block positioned in said bore; an inverted L-shaped bracket extending outwardly and downwardly from each extremity of said block; a cultivator blade secured to the lower extremity of each bracket; and set screws in said head for locking said block against rotation.

4. Means for supporting a pair of cultivator blades on a cultivator comprising: a shank for attachment to said cultivator; a horizontal head formed on said shank and provided with a cylindrical bore; a cylindrical block positioned in said bore; an inverted L-shaped bracket extending outwardly and downwardly from each extremity of said block; and a cultivator blade secured to the lower extremity of each bracket, said brackets being adjustable in said block so that the spacing of said blades may be varied.

5. Means for supporting a pair of cultivator blades on a cultivator comprising: a shank for attachment to said cultivator; a horizontal head formed on said shank and provided with a cylindrical bore; a cylindrical block positioned in said bore; an inverted L-shaped bracket extending outwardly and downwardly from each extremity of said block; a cultivator blade secured to the lower extremity of each bracket, and means for locking said block at any desired position in said head, said brackets being slidable in said block; and locking means for locking said brackets at any desired degree of extension.

PETER DAY, Jr.